United States Patent Office 3,537,908
Patented Nov. 3, 1970

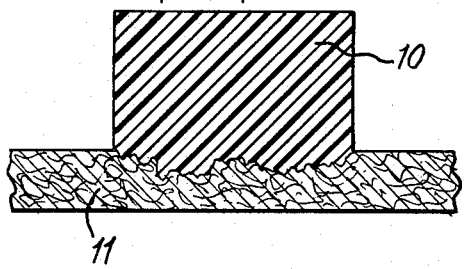
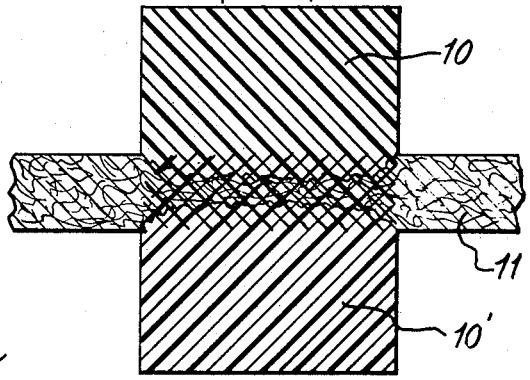
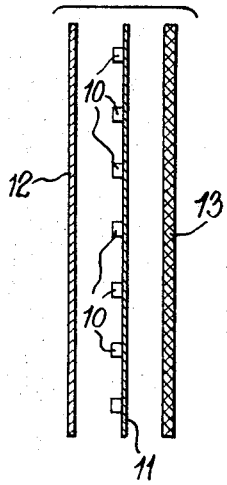 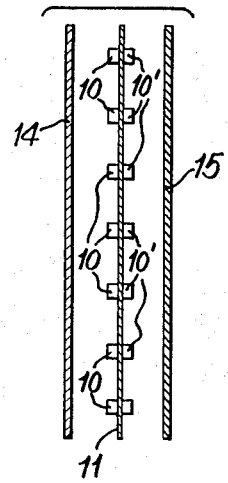 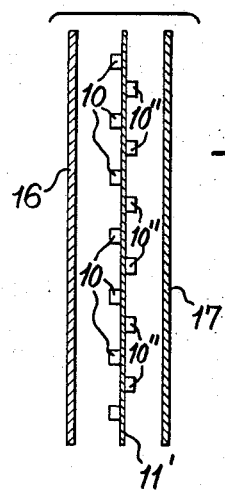
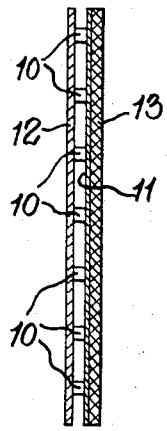 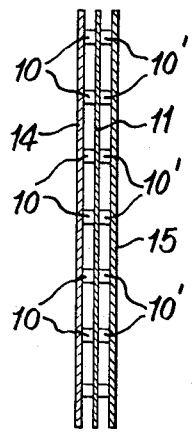 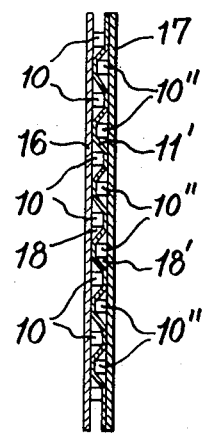 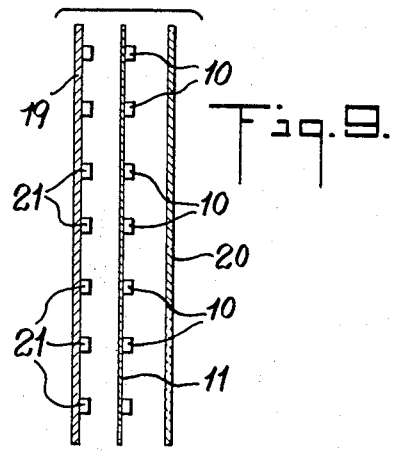

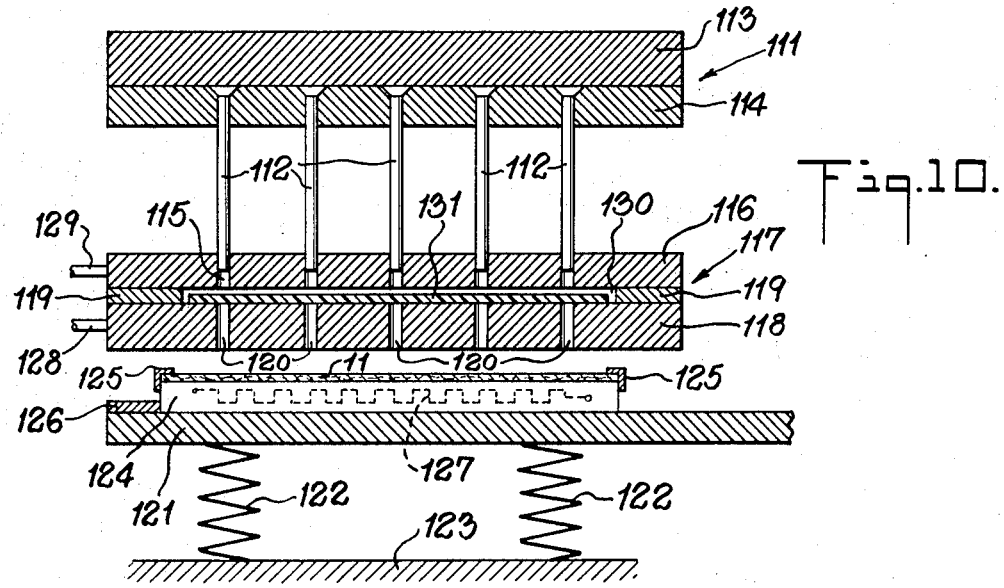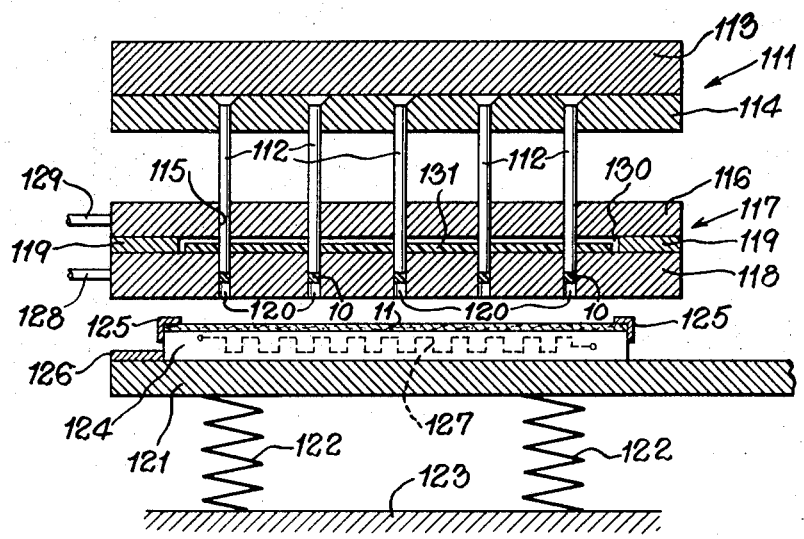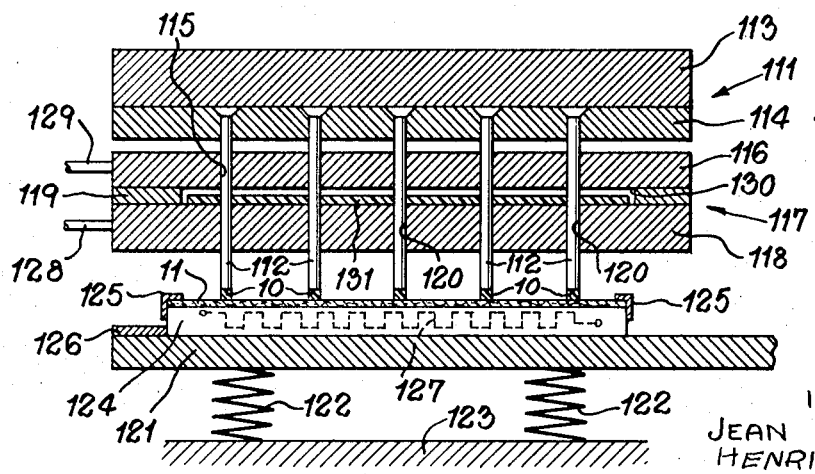

3,537,908
COMPOSITE SEPARATOR MEANS FOR ELECTRO-
CHEMICAL POWER SOURCES AND POWER
SOURCES EMBODYING THEM
Jean Henri Doll, Aulnay-sous-Bois, and Henri Desire
Druesne, La Courneuve, France, assignors to Societe
des Accumulateurs Fixes et de Traction (Societe
Anonyme), Romainville, France, a company of France
Filed Feb. 21, 1968, Ser. No. 707,072
Claims priority, application France, Apr. 28, 1967,
104,551
Int. Cl. H01m 3/04
U.S. Cl. 136—145                                    8 Claims

ABSTRACT OF THE DISCLOSURE

Composite separating means for electrodes of electrochemical power sources comprising sheets of separator material to which unit spacer elements of selected shapes and dimensions are permanently secured in selected patterns and method of preparing such means by severance of individual spacer elements from sheets of spacer material and directly depositing and securing the severed elements of selected shapes to said separator sheets in prescribed patterns, and electrochemical power sources utilizing such composite separating means between adjacent electrodes to provide ready penetration of and storage of electrolyte between electrodes for operation of the power sources.

RELATED APPLICATIONS

A related application Ser. No. 536,395 filed Mar. 22, 1966 is pending.

BRIEF SUMMARY OF THE INVENTION

In the aforesaid copending application, methods and apparatus for providing uniform separation between electrodes has been disclosed. The method therein comprises utilizing punching apparatus to punch out individual separator units from a sheet of such material and secure these units directly to electrodes as by welding, adhesion or riveting and thereafter to assemble such separator unit bearing electrodes with other electrodes to form the electrochemical cell.

Principal objects and features of the present invention are the provision of improved separators or spacing means between electrodes of electrochemical power sources and methods for their manufacture, as well as improved electrochemical power sources embodying such separator or spacing means.

According to the improvements of the present invention, the unit spacer parts are fastened to or in a separating sheet, e.g., by glueing, welding or fitting or rivetting under pressure and project from at least one face of the said separator sheet forming a composite separator means which is then placed so that said unit spacer parts lie between the electrodes which are to be separated.

Great advantages result from this invention, among which may especially be mentioned:

The possibility of manufacturing a composite separator provided with its unit spacer parts from a preferably soft or pliant separating material by a continuous process, thus making easier the assembly of cells or batteries;

The possibility of suitably anchoring the unit spacer parts between the electrodes especially when the said unit parts cannot be directly fastened on such electrodes, for example, when the latter are of expanded metal or are very porous;

The possibility, by a proper selection of the separating sheet material, to provide between the electrodes either a store of electrolyte or a semi-permeable separator or a suitable ion exchange membrane, etc., depending upon requirements: in any case, the presence of unit spacer parts affixed to the separating sheet prevents the usual drawbacks resulting from bulging, expanding or warping of the said separating sheet.

This invention also relates to composite separator means, manufactured according to the process of the invention, the said means being more especially remarkable in that they comprise a carrier constituting the said separating sheet on which are fastened the unit spacer parts, the latter particularly being made of insulating material, said unit spacer parts being cut or severed from a sheet of suitable insulating material, for example, by means of punches or similar tools cooperating with a die plate, the said cut unit spacer parts having selected shapes, sizes and distributions on the carrier depending on the requirements for electrolyte flow, diffusion, electrical conductivity and physical strength.

Other objects and features of the present invention will become apparent from the following description of some embodiments solely given as examples and illustrated in the accompanying drawings, wherein:

FIG. 1 is a sectional view on a large scale of a unit spacer part fixed to a fragmentary portion of a separating sheet according to the present invention;

FIG. 2 is a view similar to FIG. 1 relating to another embodiment;

FIGS. 3, 4 and 5 are diagrammatical exploded views of composite separator means comprising a separating sheet bearing spacer parts according to the present invention positioned between two adjacent electrodes;

Figure 13:
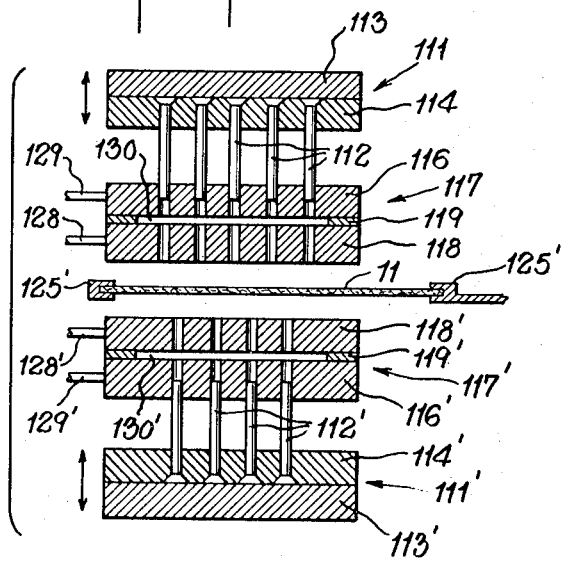

FIGS. 6, 7 and 8 respectively correspond to FIGS. 3, 4 and 5 and show how the different components are positioned in assembled condition of an electrochemical power source;

FIG. 9 is similar to diagrammatic FIGS. 3 to 5 and shows yet another embodiment;

FIGS. 10, 11 and 12 are diagrammatic partly sectional views illustrating details of tools of a machine and successive steps in a method of practicing the invention; and FIG. 13 is a similar diagrammatic partly sectional view of a modified machine and method for practicing the invention.

DETAILED DESCRIPTION

Referring to the drawing, according to the embodiment shown in FIG. 1, the unit spacer parts 10 are fastened to a sheet 11 constituting the separating sheet. The spacer parts 10 are, for example, made of synthetic material such as polyethylene. The separating sheet 11 is a soft or flexible sheet, being, for example, paper, woven fabric or felt made of fibers, or a semipermeable material or an ion exchange membrane resistant to operating conditions in the primary or secondary cell in which the composite separator means is to be used.

The unit spacer parts 10 are advantageously obtained as by severance, for example, by punching out from a sheet of suitable insulating material as by punches or similar tools and a die plate. The shape, size and distribution of the spacer parts 10 are selected according to the requirements of electrolyte flow and diffusion, electrical conductivity and physical strength.

For fastening the unit spacer parts 10 onto the sheets 11 any appropriate method such as glueing, welding or fitting under pressure may be used. For example, the sheet 11 may be impregnated with an evaporative solvent of the material of which the unit spacer parts 10 are made, and when these parts are pressed against the sheet 11 partial dissolution takes place at the areas in contact with the sheet 11 resulting in a mutual penetration of the fibers of the sheet 11 and the spacer parts, so that these parts are strongly adhered to the sheet when the solvent evaporates.

According to the embodiment shown in FIG. 2, to each unit spacer part 10 on one side of sheet 11 is associated a like unit part 10' located on its opposite side and both parts 10 and 10', for example, united by the partial dissolution of their bases by the solvent impregnated into separating sheet 11.

FIGS. 3 to 8 show how such a separating sheet 11, bearing the spacer parts 10, or 10–10', aligned and facing each other on opposite sides at the same location, or 10–10" on opposite sides, but in staggered relationship can be used to separate two electrodes respectively 12/13 (FIG. 3), 14/15 (FIG. 4) and 16/17 (FIG. 5). The nature of the separating sheet 11, the shape, arrangement and distribution of the spacer parts 10 and/or 10' or 10" are chosen according to the particular power source requirements.

For example, in the embodiments shown in FIGS. 3 and 6, the positive electrode 12 is, for example, silver oxide and the negative electrode 13 is constituted by an expanded zinc sheet. With such a system when used for deferred action batteries, the required electrolyte should quickly fill up all the space between the electrodes as soon as the priming of the battery is triggered, and on the other hand, the separating sheet 11 must be able to retain electrolyte. The presence of spacer parts 10 allows for a fast flow of the priming electrolyte between the electrodes. However, it would be difficult to effect a separation between the electrode 13 made of expanded metal, i.e. having many holes, and the electrode 12 by the use of mere unit spacer parts such as 10 fastened on one electrode as described in the aforesaid application. In addition, it would be difficult to fasten these parts on the electrodes themselves. On the contrary, due to the improvement of the present invention, the unit spacer parts such as 10, can readily be fastened and suitably distributed on the separating sheet 11 so that in assembly they bear against the positive electrode 12. Moreover, if such a composite separator means bearing the properly distributed unit separator parts 10 is chosen so as to be porous and absorbent, it will retain the electrolyte then promoting the electrochemical exchanges in the battery or cell.

Moreover, at the instant of priming, the flow of electrolyte between the electrodes will not be hindered by the swelling of the separating sheet due to the unit spacer parts 10 which are substantially pointlike or of small area. It is to be noted that in the case of the embodiment shown in FIGS. 3 and 6, the sheet 11 made of paper, for example, is placed in direct contact with the negative expanded zinc electrode 13 through which the electrolyte can easily flow, while the spacers 10 engage positive electrode 12, whereas in a reversed kind of assembly, i.e. wherein the sheet 11 is placed directly against the positive electrode 12, the electrolyte could not so easily or quickly reach the said positive silver oxide electrode 12.

According to the embodiment shown in FIGS. 4 and 7, spacer parts 10, 10' being provided on both faces of the sheet 11, the electrolyte can freely flow and reach every point of the two electrodes 14 and 15. The sheet 11 can also be chosen such as to promote the battery operation according to electrode types, being, for example, a semipervious sheet or an ion exchange membrane.

It may also be seen that cells or batteries using composite separator means according to this invention can be directly assembled and maintained in their final dimensions despite any swelling tendency of the composite separator means, whereas in the prior art when the separator swelled the electrode separator pack practically filled the whole free space initially left in the container, so that the electrolyte could no longer flow to all portions of the electrodes without hindrance.

According to the embodiment shown in FIGS. 5 and 8, the unit spacer parts 10, 10" are relatively offset or staggered so as not to lie exactly opposite each other as do unit spacer parts 10, 10' in FIGS. 4 and 7. Consequently, when electrodes 16 and 17 are assembled with a composite separator means constituted by the sheet 11' and the staggered unit spacer parts 10, 10", the sheet 11' will be in contact alternately with the electrode 16 and the electrode 17, and will on assembly with such electrodes have, therefore, a corrugated shape. For example, if the parts 10, 10" are placed in rows, transverse channels 18 and 18' for the electrolyte flow will be provided on both sides of the corrugated sheet 11' (FIG. 8). Obviously, the priming electrolyte should be introduced in the direction of these channels 18 and 18'. Naturally, when the arrangements of parts 10, 10" is not linear, various kinds of patterns will be obtained for the shape of sheet 11', presenting ridges and channels in various selected directions.

According to the embodiment shown in FIG. 9, two opposite electrodes 19 and 20 are separated by a composite separator comprising a sheet 11 provided with spacer parts 10 fastened to it and also with similar spacer parts 21, the latter fastened to the electrode 19, according to the aforesaid application, for example, unit parts 21 being placed in exact alignment with the unit parts 10. The resulting pattern for such a cell assembly of electrodes and separating sheet and parts then corresponds approximately to the arrangement shown in FIG. 7.

Furthermore, the composite separator means according to the invention provides a free volume for the immediate access of the priming electrolyte between adjacent electrodes and simultaneously provides the means to retain in storage therein a sufficient amount of electrolyte to ensure satisfactory electrochemical operation.

The flow of electrolyte, particularly at the time of priming of a deferred action cell comprising composite separator means according to this invention, is quickly established since the electrolyte injected under a determined pressure into the container reaches immediately all points located between the electrodes and the porous carrier (or separating sheet) on which are fastened the spacer parts projecting from the side of said carrier facing the said electrode. When such spacer parts project from both sides of the porous carrier, the flow of electrolyte simultaneously reaches both electrodes. This latter arrangement is not always needed, especially when one of the electrodes is very porous, for instance, being constituted by the expanded metal sheet electrode 13.

At the same time of its reaching all points between the electrode and the porous support, the electrolyte impregnates the electrode and the separating support by capillarity, thus building-up in every point a store of electrolyte sufficient to ensure good operation of the cell. As its volume increases, the porous carrier support 11 will more or less fill up the free space between the separator parts, without excessive pressure and without abnormal increase of the volume of the electrode-separator pack, as it has been generally observed to do with cells of the prior art.

Apparatus and methods for preparing composite separator means embodying the invention are shown diagrammatically in FIGS. 10–13 inclusive, FIGS. 10–12 showing cutting, deposition and attachment of unit spacer parts from a sheet of insulating material onto an appropriate separator sheet.

According to the embodiment shown in FIGS. 10 to 12, a machine intended for severing the unit spacer parts 10 and applying them to a separator sheet 11 according to the present invention comprises a driver or rivet-like punch carrying element 111, its drivers or punches being designated 112. The element 111 is advantageously composed of a backing plate 113 and of a carrying plate 114 in which said drivers 112 are mounted for vertically reciprocal movement.

The lowest ends of the drivers or rivet punches 112 are always engaged in aligned holes 115 of a plate 116 which latter serves as the guide element of the die component 117, the second plate part 118 of which acts as a cutting tool and which is spaced from plate 116 as by spacing members 119. The holes 115 and 120 of the respective plates 116 and 118 are, of course, in alignment with the drivers or punches 112. Below the die plate 118 a stage plate 121 is located, being mounted on spring-like absorbers 12 soldered or otherwise secured to a fixed base 123.

A reciprocally movable slide 124 with guide jaws 125 which latter serve to position a separate sheet e.g., sheet 11 to which spacer parts 10 are to be applied is positionable on the surface of the stage plate 121. Optionally, means of heating such as an electrical resistance heating coil 127 may be mounted in the slide 124. This heater 127 could, of course, be replaced by another type heating means, for instance, with a steam coil (not shown). The plates 116 and 118 may be hollow so that cooling means, for instance, water, may be circulated through them as desired, entering through a pipe 128 and exiting through another pipe 128. The water can be admitted as desired to cool the die plates 117 and 118 when necessary.

Between the die plates 116 and 118, the spacer members 119 provide a space or chamber 130 into which a sheet 131 of the desired spacing material from which the nut spacer parts 10 are to be cut can be inserted. The thickness of the sheet 131 is, of course, chosen according to the desired height of spacer 10 to give the spacing distance required between the components of the cells and batteries to be manufactured.

The operations of the machine are readily apparent from FIGS. 10 to 12. The machine, being at the outset in the state shown in FIG. 10, a separator sheet 11 is placed on the slide 124 and the slide 124 is moved into position under the die plate 118. A sheet 131 of spacing material is then inserted into the chamber 130. Then, driver plate 111 is moved down the drivers 112 punch or cut out from said sheet 131 as shown in FIG. 11 the unit separate spacer parts 10 or the like which are guided in the holes 120 of the plate 118. The drivers or rivet punches 112 are guided in their cutting operation by the guide plate 116 and by the die plate 118. All the cut spacer parts 10 or the like are pushed downwardly by the drivers 112 ass hown in FIG. 12 onto the upper surface of separator sheet 11 or the like and the adjusted biasing action of the spring means 122 provides a suitable pressure to press the unit parts 10 onto the sheet 11 or the like.

The distribution, the shape, the size and the number of the spacer parts 10 or the like chosen in relation to the desired electrolyte flow, the diffusion of gas, the electric conductivity, the mechanical strength, etc., which are desired for the cell or battery to be formed.

In the case of FIGS. 10–12, the separator sheet 11 advantageously is saturated beforehand with a vaporizable solvent for the material of the unit spacer parts 10 to cause dissolution of the bases of parts 10 and their adhesion to the sheet 11 as they are pressed onto it. In this case, said heating means can be used to cause vaporization of the solvent. Alternatively, an adhesive product which will cause parts 10 to stick to the sheet 11 may be used. Said adhesive product must be chosen to withstand the operating conditions of the desired power source, that is to say, the internal temperature, the electrolyte, etc. This adhesive may be of a polymerizable type and may advantageously be in the form of a tape, one face of which is pre-adhered to the sheet 113 and the second outer face of which is normally protected by suitable cover sheet (not shown) such as paper which is stripped therefrom just before its insertion into the machine space 130.

Many variations may be applied to the above description, for example, the spacer parts 10 and 10' could be applied similarly and at the same time to the same separator sheet 11 by the machine of FIG. 13 which duplicates the arrangement of FIGS. 10–12 also on the underside of sheet 11, corresponding parts being denoted by primed reference characters. The underside punches 112' can either be aligned with punches 112 or staggered as desired.

The machine operations and process can be semi-continuous in order to operate with large surface sheets 11. The drivers or rivet punches 112 and 112' cut and punch a first series of spacer parts and return to allow the sheet 11 and spacer sheet 131 and/or 131' to advance, and the sequential operation of the machines as shown in FIGS. 10–13 goes on and on. Therefore, this process can be made fully automatic and can be used to operate on very long separator sheets such as band-shaped sheets and continuous sheets of spacer material, said sheets being advanced cyclically after each severance and deposition of spacer parts on a particular area of the separator sheet.

Although specific embodiments of the invention have been described and shown, variations in practice within the scope of the appended claims are possible and are contemplated. There is no intention, therefore, of limitation to the exact disclosure herein presented or to the abstract.

What is claimed is:

1. An electrochemical power source comprising at least a pair of electrodes of opposite polarity, an electrolyte and composite separator means comprising a sheet of absorbent, soft and pliant separator material bearing individual spacer units of insulating material secured to project from both faces thereof, said spacer units on opposite faces of said sheet being staggered, said sheet having a corrugated shape between said electrodes being in contact alternatively with the respective opposite polarity electrodes whereby the two faces of the sheet delimit channels with the respective opposite polarity electrodes for the said electrolyte.

2. An electrochemical power source according to claim 1 wherein said sheet of separator material is paper.

3. An electrochemical power source according to claim 1 wherein said spacer units are of insulating material soluble in a solvent and secured with pressure to said sheet by partial dissolution of base portions of said insulating material by solvent imbibed in said sheet which effects interpenetration of said sheet by dissolved base portions of the spacer units and their strong adherence to said sheet upon evaporation of the solvent therefrom, said units projecting from at least one face of said sheet.

4. An electrochemical power source according to claim 1 wherein said separator material consists of woven fabric.

5. An electrochemical power source according to claim 1 wherein said separator material consists of felted fibers.

6. An electrochemical power source according to claim 1 wherein said separator material consists of semi-permeable material.

7. An electrochemical power source according to claim 1 wherein said separator material consists of ion exchange membranes.

8. An electrochemical power source source comprising at least a pair of electrodes of opposite polarity, an electrolyte and composite separator means comprising a sheet of absorbent, soft and pliant separator material, individual spacer units at opposite faces of said sheet arranged in staggered relationship with respect to each other, said sheet lying between said pair of electrodes and having a corrugated shape between said electrodes as a result of the staggered relationship of the spacer units and being in contact alternatively with the opposed faces of the respective opposite polarity electrodes wherein the two faces of said sheet delimit channels with the respective opposed faces of opposite polarity electrodes for the said electrolyte.

References Cited

UNITED STATES PATENTS

| | | | |
|---|---|---|---|
| 391,229 | 10/1888 | Butler | 134—143 XR |
| 457,880 | 8/1891 | Madden | 136—151 |
| 1,415,275 | 5/1922 | Sturges | 136—151 |
| 1,628,104 | 5/1927 | Benner | 136—151 XR |
| 2,117,382 | 5/1938 | Wells | 136—143 |
| 2,531,504 | 11/1950 | Dillehay et al. | 136—145 |
| 2,978,529 | 4/1961 | Brisley et al. | 136—148 XR |

DONALD L. WALTON, Primary Examiner

U.S. Cl. X.R.

136—148